(12) United States Patent
Sakata

(10) Patent No.: US 8,761,673 B2
(45) Date of Patent: Jun. 24, 2014

(54) SHORT-RANGE WIRELESS COMMUNICATION APPARATUS

(75) Inventor: Ryuuji Sakata, Kariya (JP)

(73) Assignee: Denso Corporation, Kariya (JP)

( * ) Notice: Subject to any disclaimer, the term of this patent is extended or adjusted under 35 U.S.C. 154(b) by 206 days.

(21) Appl. No.: 13/535,841

(22) Filed: Jun. 28, 2012

(65) Prior Publication Data

US 2013/0005263 A1 Jan. 3, 2013

(30) Foreign Application Priority Data

Jun. 30, 2011 (JP) ................................. 2011-145784

(51) Int. Cl.
*H04B 7/00* (2006.01)

(52) U.S. Cl.
USPC ..................................... 455/41.2; 455/569.2

(58) Field of Classification Search
USPC .................. 455/41.2, 569.1, 569.2, 41.3, 512
See application file for complete search history.

(56) References Cited

U.S. PATENT DOCUMENTS

| | | | |
|---|---|---|---|
| 6,687,517 B2 * | 2/2004 | Kinnunen | 455/569.1 |
| 7,050,834 B2 * | 5/2006 | Harwood et al. | 455/563 |
| 7,162,276 B2 * | 1/2007 | Iwase | 455/569.1 |
| 8,620,217 B2 * | 12/2013 | Saito et al. | 455/41.2 |
| 2006/0079182 A1 | 4/2006 | Matsuda | |
| 2007/0129116 A1 * | 6/2007 | Katoh et al. | 455/569.1 |
| 2008/0269961 A1 | 10/2008 | Shitanaka et al. | |
| 2009/0032581 A1 | 2/2009 | Esslinger et al. | |
| 2009/0253466 A1 | 10/2009 | Saito et al. | |
| 2010/0144398 A1 | 6/2010 | Abeta | |
| 2010/0197362 A1 | 8/2010 | Saitoh et al. | |
| 2010/0210316 A1 | 8/2010 | Okayasu | |
| 2011/0237191 A1 | 9/2011 | Saito et al. | |
| 2013/0052955 A1 * | 2/2013 | Tamura | 455/41.2 |
| 2013/0122969 A1 | 5/2013 | Saitoh et al. | |

FOREIGN PATENT DOCUMENTS

| | | |
|---|---|---|
| JP | 2006-148864 | 6/2006 |
| JP | 2006-352522 | 12/2006 |
| JP | 2006-352799 | 12/2006 |
| JP | 2009-124463 | 6/2009 |
| JP | 2009-206866 | 9/2009 |
| JP | 2010-010876 | 1/2010 |
| JP | 2010-187289 | 8/2010 |
| JP | 2011-018975 | 1/2011 |

OTHER PUBLICATIONS

Office Action issued Jul. 9, 2013 in Japanese Application No. 2011-145783 (with English translation) corresponding to co-pending U.S. Appl. No. 13/535,765.
Office Action dated Mar. 31, 2014 in the corresponding Chinese Application No. 201210225402.2 with English translation.

* cited by examiner

*Primary Examiner* — Sonny Trinh
(74) *Attorney, Agent, or Firm* — Harness, Dickey & Pierce, PLC

(57) ABSTRACT

A short-range wireless communication apparatus including a connection device and a control device is disclosed. The connection device is capable of connecting a communication protocol to a communication destination device. After transmitting a connection request signal of a first protocol to the communication destination device, the connection device waits for receipt of a response signal. When a request to connect a second protocol is generated while the connection device is waiting for receipt of a response signal, the control device causes the connection device to interrupt waiting for the receipt of the response signal and transmits the connection request signal of the second protocol to the communication destination device.

8 Claims, 13 Drawing Sheets

SHORT-RANGE WIRELESS COMMUNICATION APPARATUS

CROSS REFERENCE TO RELATED APPLICATION

The present application is based on and claims priority to Japanese Patent Application No. 2011-145784 filed on Jun. 30, 2011, disclosure of which is incorporated herein by reference.

TECHNICAL FIELD

The present disclosure relates to a short-range wireless communication apparatus that is capable of connecting a communication protocol to a communication destination apparatus. In cases where the communication destination apparatus receives a connection request signal of the communication protocol via a short-range wireless communication line, the communication destination apparatus transmits a connection permission response signal or a connection rejection response signal of the communication protocol via the short-range wireless communication line in accordance with a user operation.

BACKGROUND

A short-range wireless communication module mounted in a short-range wireless communication apparatus having a short-range wireless communication function is capable of simultaneously connecting a plurality of communication protocols (so called multi-connection), which define data communication, to a short-range wireless communication module of a communication destination apparatus. See JP2008-273370A (US2008/0269961A), JP2009-253601A (US2009-0253466A), and JP-2009-253603A (US2009-0253466A).

In relation to the above, the inventor of the present application has found out the following. In response to a request to connect a communication protocol, the short-range wireless communication module transmits a connection request signal of the communication protocol to a short-range wireless communication module of a communication destination apparatus. Subsequently, if the short-range wireless communication module receives a connection permission response signal of the communication protocol from the short-range wireless communication module of the communication destination apparatus, the short-range wireless communication module initiates a connection process of the communication protocol (acknowledges the connection request). If the short-range wireless communication module receives a connection rejection response signal of the communication protocol from the short-range wireless communication module of the communication destination apparatus, the short-range wireless communication module does not initiate the connection process of the communication protocol (rejects the connection request).

In some cases, depending on the specifications of the communication destination apparatus and the type of the communication protocol, the following situation may arise. When receiving a connection request signal of a communication protocol, the communication destination apparatus inquires a user about whether the user permits or rejects to connect the communication protocol. In such cases, after the user operation on the communication destination apparatus is performed, the communication destination apparatus can transmit a connection permission response signal or connection rejection response signal of the communication protocol. Therefore, if the user operation on the communication destination apparatus is not performed after the transmission of the connection request signal of the communication protocol, the short-range wireless communication module can receive neither the connection permission response signal of the communication protocol nor the connection rejection response signal of the communication protocol from the short-range wireless communication module of the communication destination apparatus, depending on the specifications for the communication destination apparatus and the type of the communication protocol. Hence, the short-range wireless communication module cannot determine whether or not to initiate the connection process of the communication protocol.

Meanwhile, when the short-range wireless communication module is waiting to receive a connection permission response signal or connection rejection response signal of a first communication protocol from the short-range wireless communication module of the communication destination apparatus after transmitting a connection request signal of a first communication protocol, a connection request of a second communication protocol may be generated. In such a case, since the short-range wireless communication module is waiting (in a state of waiting) to receive the connection permission response signal or connection rejection response signal of the first communication protocol from the short-range wireless communication module of the communication destination apparatus, the short-range wireless communication module cannot transmit a connection request signal of the requested second communication protocol to the short-range wireless communication module of the communication destination apparatus. As a result, the short-range wireless communication module cannot immediately initiate a connection process for the second communication protocol. Consequently, it becomes impossible to meet a user's request, to promptly use a function offered by the second communication protocol.

SUMMARY

The present disclosure is made in view of the foregoing. It is an object of the present disclosure to provide a short-range wireless communication apparatus that is capable of meeting a user request to promptly use a function of a communication protocol even if a connection request of the communication protocol is made while the short-range wireless communication apparatus is waiting to receive a connection permission response signal or connection rejection response signal of another communication protocol from the communication destination apparatus.

According to a first example of the present disclosure, a short-range wireless communication apparatus comprises an own connection device and a control device. The own connection device is capable of connecting a communication protocol to a communication destination side connection device. In cases where the communication destination side connection device receives a connection request signal of the communication protocol via a short-range wireless communication line, the communication destination side connection device transmits a connection permission response signal or a connection rejection response signal of the communication protocol via the short-range wireless communication line in accordance with a user operation. The communication protocol includes a first communication protocol and a second communication protocol. After transmitting the connection request signal of the first communication protocol to the communication destination side connection device via the short-range wireless communication line, the own connection device waits for receipt of the connection permission response signal or the connection rejection response signal of the first communication protocol. When the control device determines that a request to connect the second communication protocol is generated while the own connection device is waiting for receipt of the connection permission response signal or the connection rejection response signal of the first communication protocol, the control device causes the own connection device to interrupt waiting for the receipt of the connection permission response signal and the connection rejection response signal of the first communication protocol from the communication destination side connection device, and additionally, the control device causes the own connection device to transmit the connection request signal of the second communication protocol to the communication destination side connection device via the short-range wireless communication line.

According to the above short-range wireless communication apparatus, if the request to connect the second communication protocol is generated while the own connection device is waiting for receipt of the connection permission response signal or the connection rejection response signal of the first communication protocol, the own connection device interrupts waiting, for the receipt of the connection permission response signal and the connection rejection response signal of the first communication protocol from the communication destination side connection device, and additionally, the own connection device transmits the connection request signal of the second communication protocol to the communication destination side connection device via the short-range wireless communication line. Thereafter, upon receipt of the connection permission response signal of the second communication protocol, the short-range wireless communication apparatus can promptly initiate a connection process of connecting the second communication protocol. Therefore, it becomes possible to properly meet a user request to promptly use a function of the second communication protocol.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
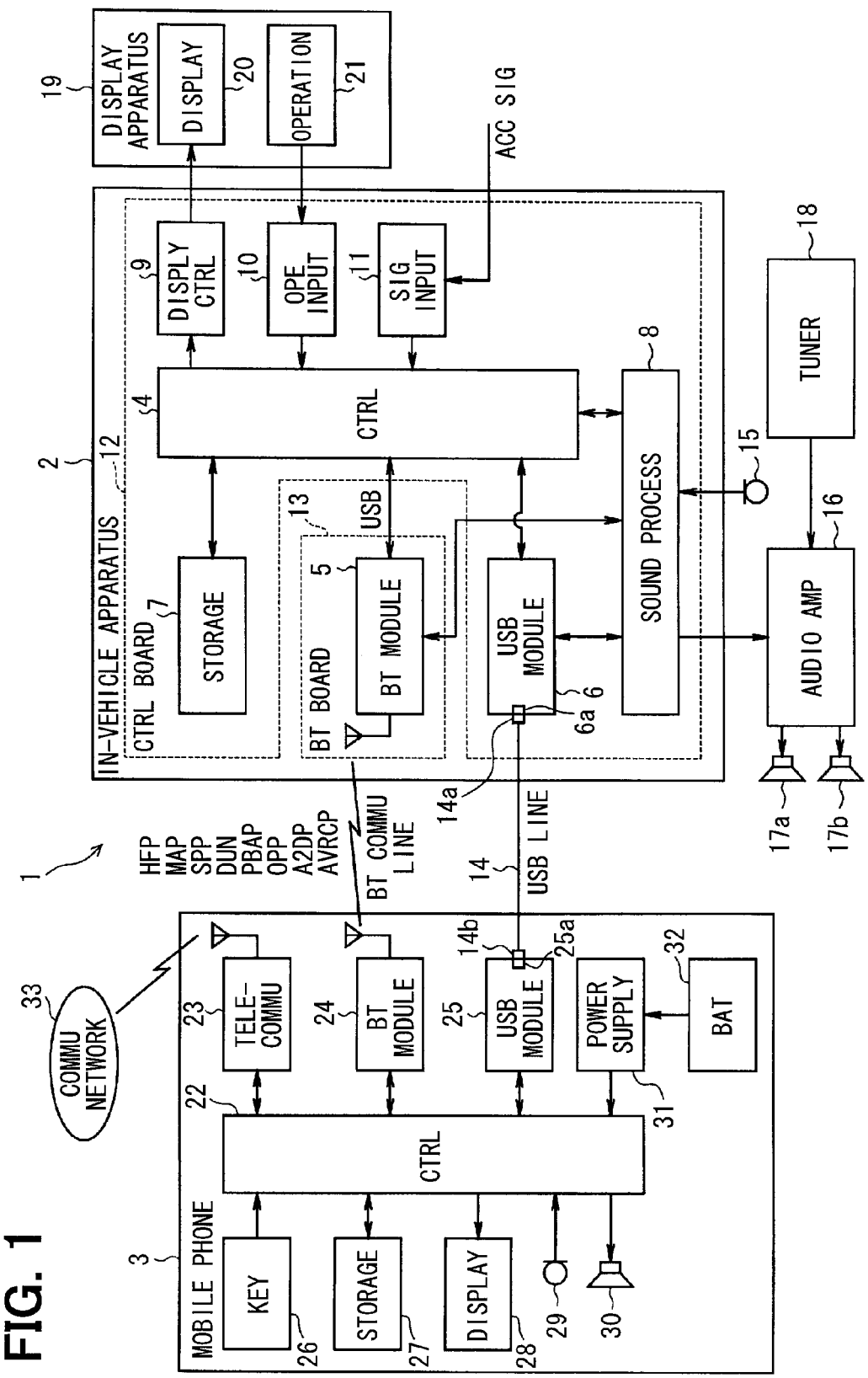
FIG. 1 is a functional block diagram illustrating a BT communication system of one embodiment.

A Bluetooth-supporting in-vehicle apparatus having a Bluetooth communication function (hereinafter simply referred to as the in-vehicle apparatus) will be described with reference to the accompanying drawings in accordance with one embodiment. Bluetooth is a registered trademark and is referred to herein as BT. In the following description, it is assumed that a BT-supporting mobile phone (hereinafter simply referred to as the mobile phone) having the BT communication function is carried into a compartment of a vehicle on which the in-vehicle apparatus is mounted, and that BT communication can be performed between the in-vehicle apparatus and the mobile phone.

A BT communication system 1 includes, the in-vehicle apparatus 2 (corresponding to a short-range wireless communication apparatus) mounted on the vehicle and the mobile phone 3 (corresponding to a communication destination apparatus) carried into the vehicle compartment. The in-vehicle apparatus 2 includes, for example, a control unit 4 (corresponding to a control means and a control device), a BT module 5 (corresponding to a own connection means and a own connection device), a USB (universal serial bus) module 6, a storage unit 7, a voice processing unit 8, a display control unit 9, an operation input unit 10, and a signal input unit 11. The control unit 4, the USB module 6, the storage unit 7, the voice processing unit 8, the display control unit 9, the operation input unit 10, and the signal input unit 11 are physically mounted on a control board 12. The BT module 5 is physically mounted on a BT module board 13, which is separated from the control board 12. The control unit 4 is connected with the BT module 5 by USB.

The control unit 4 includes a microcomputer with, for example, a CPU, a RAM, a ROM, and an I/O bus, and control generally all of operations of the in-vehicle apparatus 2 including communication operation, data management operation etc. The BT module 5 is connected to a BT module of the mobile phone 3 via a BT communication line (corresponding to a short-range wireless communication line) and capable of performing BT communication with the mobile phone 3 via the BT communication line. The BT module 5 is configured to be capable of simultaneously connecting (so-called multiple connection) a plurality of profiles defined by the BT communication standard, including, for example, an HFP (hands-free profile) for defining hands-free communication, a MAP (message access profile) for defining the transfer of e-mail data, an SPP (serial port profile) for defining a virtual serial port for data communication, a DUN (dial-up networking profile) for defining a dial-up connection to the Internet, a PBAP (phone book access profile) for defining the transfer of phone book data, an OPP (object push profile) for defining the transfer of phone book data, an A2DP (advanced audio distribution profile) for defining the transfer of sound data, and an AVRCP (audio/video remote control profile) for defining the transfer of control data concerning the control of sound data. The HFP, MAP, SPP, DUN, PBAP, OPP, A2DP, and AVRCP, for example, are communication protocols that are defined on an individual function basis.

The USB module 6 has a connection terminal 6a. A connection terminal 14a of a USB connection cable 14 can be connected to and disconnected from the connection terminal 6a. While the connection terminal 14a of the USB connection cable 14 is connected the connection terminal 6a and the other connection terminal 14b of the USB connection cable 14 is connected to a connection terminal of a USB module of the mobile phone 3, the USB module 6 can connect a USB communication line to the USB module of the mobile phone 3 and perform USB communication with the mobile phone 3 via the USB communication line.

The storage unit 7 has a storage area for storing various data. When the BT module 5 connects the MAP to the BT module of the mobile phone 3, the storage unit 7 stores e-mail data (e.g., sender information indicative of an e-mail sender, receipt date/time information indicative of the date and time of e-mail receipt by the mobile phone 3, type information indicative of the type of e-mail, and subject information indicative of an e-mail subject entered, for instance, by a sender) that is transferred from the mobile phone 3 to the BT module 5. Further, when the BT module 5 connects the PBAP to the BT module of the mobile phone 3, the storage unit 7 stores, for example, phone book data transferred from the mobile phone 3 to the BT module 5, outgoing call history data indicative of the relationship between outgoing call time and outgoing call phone numbers concerning calls made from the in-vehicle apparatus 2 or calls made from the mobile phone 3 having the HFP connection to the in-vehicle apparatus 2, and incoming call history data indicative of the relationship between incoming call time and incoming call phone numbers concerning calls received by the mobile phone 3 having the HFP connection to the in-vehicle apparatus 2.

The voice processing unit 8 is connected to a microphone 15 and an audio amplifier 16. The microphone 15 is placed in the vehicle compartment and positioned, for instance, near a steering wheel so as to pick up a user's voice with ease. The audio amplifier 16 is disposed outside the in-vehicle apparatus 2 and connected to loudspeakers 17a, 17b.

When the microphone 15 inputs the voice uttered by the user as outgoing voice data while the HFP is connected between the BT module 5 and the BT module of the mobile phone 3, the voice processing unit 8 subjects the inputted outgoing voice data to audio processing and outputs the processed data to the BT module 5. When incoming voice data is inputted from the BT module 5, the audio processing unit 8 outputs the inputted incoming voice data to the audio amplifier 16.

Further, while the A2DP and the AVRCP are connected between the BT module 5 and the BT module of the mobile phone 3, the voice processing unit 8 outputs to the audio amplifier 16 the sound data that is transferred from the BT module of the mobile phone 3 to the BT module 5 by the A2DP and the AVRCP. Furthermore, while USB communication is performable between the USB module 6 and the USB module of the mobile phone 3, the voice processing unit 8 outputs to the audio amplifier 16 the sound data that is transferred from the USB module of the mobile phone 3 to the USB module 6 via the USB communication line.

Upon receipt of the incoming voice data or sound data from the voice processing unit 8, the audio amplifier 16 amplifies the received voice data or sound data and outputs the amplified data from the loudspeakers 17a, 17b. The audio amplifier 16 is also connected to a tuner deck 18. When, for instance, music data is played from a music recording medium and is inputted from the tuner deck 18, the audio amplifier 16 also amplifies the inputted music data and outputs the amplified data through the loudspeakers 17a, 17b.

A display apparatus 19 includes a display unit 20 and an operation unit 21. The display unit 20 (corresponding to a notification means and a notification device) displays various display screens. The operation unit 21 forms on-screen touch switches. Upon receipt of a display command signal from the control unit 4, the display control unit 9 controls the display operation of the display unit 20 of the display apparatus 19 in accordance with the input display command signal. When the user operates an on-screen touch switch, the operation unit 21 inputs an operation detection signal to the operation input unit 10 and the operation input unit 10 outputs the input operation detection signal to the control unit 4. The control unit 4 analyzes the operation detection signal inputted from the operation input unit 10 to determine the user's operation.

The signal input unit 11 is connected to an ACC (accessory) switch mounted on the vehicle. Upon receipt of an ACC signal from the ACC switch, the signal input unit 11 outputs the input ACC signal to the control unit 4. The control unit 4 turns on or off an apparatus power supply depending on whether the input ACC signal is on or off. More specifically, when the ACC signal changes from off to on, the control unit 4 turns on the apparatus power supply (starts the in-vehicle apparatus 2). When the ACC signal changes from on to off, the control unit 4 turns off the apparatus power supply (stops the in-vehicle apparatus 2)

The mobile phone 3 includes, for example, a control unit 22, a telephone communication unit 23, a BT module 24 (corresponding to a communication destination side connection means and a communication destination side connection device), a USB module 25, a key input unit 26, a storage unit 27, a display unit 28, a microphone 29, a loudspeaker 30, and a power supply unit 31.

The control unit 22 includes a microcomputer with, for example, a CPU, a RAM, a ROM, and an I/O bus, and controls generally overall operations of the mobile phone 3 including communication operation, data management operation etc. The telephone communication unit 23 performs telephone communication with a communication network 33. The communication network 33 includes a mobile phone base station, a base station control apparatus, and other well-known equipment that provides mobile phone communication services. The BT module 24 has a function of connecting a BT communication line to the BT module 5 of the in-vehicle apparatus 2 and performing BT communication with the in-vehicle apparatus 2 via the BT communication line. The BT module 24 is configured to be able to simultaneously connect a plurality of profiles defined by the BT communication standard, such as the HFP, MAP, SPP, DUN, PBAP, OPP, A2DP, and AVRCP.

The USB module 25 has a connection terminal 25a. The connection terminal 25a can be connected to and disconnected from the connection terminal 14b of the USB connection cable 14. While the connection terminal 14a of the USB connection cable 14 is connected to the connection terminal 6a of the USB module 6 of the in-vehicle apparatus 2 and the other connection terminal 14b of the USB connection cable is connected to the connection terminal 25a, the USB module 25 can connect a USB communication line to the USB module 6 of the in-vehicle apparatus 2 and perform USB communication with the in-vehicle apparatus 2 via the USB communication line.

The key input unit 26 has various keys that can be operated by the user. When the user operates a key, the key input unit 26 outputs an operation detection signal to the control unit 22. The control unit 22 then analyzes the operation detection signal inputted from the key input unit 26 to determine the users operation. The storage unit 27 has a storage area for storing various data. Upon receipt of a display command signal from the control unit 22, the display unit 28 opens various display screens in accordance with the input display command signal. When a voice uttered by the user is inputted through the microphone 29 as outgoing voice data, the control unit 22 subjects the input transmitted voice data to audio processing. When incoming voice data is inputted from the telephone communication unit 23, the control unit 22 outputs the inputted incoming voice data from the loudspeaker 30 as a voice. The power supply unit 31 operates so that electrical power supplied from a battery 32, which is detachable from a main body, is supplied to various functional blocks as operating power.

When the BT module 5 transmits a profile connection request signal (a connection request signal of a communication protocol) to the BT module 24, the subsequent operation varies depending on the specifications for the BT module 24 (data communication destination for the BT module 5) and the type of a profile. In one case, the BT module 24 may automatically transmit a profile connection permission response signal (a connection permission response signal of the communication protocol), which acknowledges the connection request for the profile, or a profile connection rejection response signal (a connection rejection response signal of the communication protocol), which rejects the connection request for the profile, to the BT module 5 (regardless of whether the user operates the mobile phone 3). In another case, provided that the user operates the mobile phone 3, the BT module 24 can transmit the profile connection permission response signal or the profile connection rejection response signal to the BT module 5. The HFP and the SPP are examples of the profile that allows the BT module 24 to automatically transmit the profile connection permission response signal or the profile connection rejection response signal to the BT module 5. The PBAP and the DUN are examples of the profile that requires the user operation on the mobile phone 3 in order for the BT module 24 to transmit the profile connection permission response signal or the profile connection rejection response signal to the BT module 5. These details may be determined by a manufacturer of the mobile phone 3 from the viewpoint, for instance, of personal information protection and billing. It should be noted in this connection that the user of the mobile phone 3 may change the relevant settings after the purchase of the mobile phone 3.

Because of the above, the BT module 3 and the BT module 24 may connect a profile in the following manner. If a profile connection request is generated while the BT communication line is connected between the BT module 5 and the BT module 24, the control unit 4 of the in-vehicle apparatus 2 causes the BT module 5 to transmit the profile connection request signal to the BT module 24 via the BT communication line.

If the control unit 22 of the mobile phone 3 determines that the BT module 24 has received the profile connection request signal from the BT module 5 through the BT communication line, the control unit 22 determines the type of the profile designated by the generated connection request. If the control unit 22 determines that the profile designated by the generated connection request allows the automatic transmission of the profile connection permission response signal or profile connection rejection response signal to the in-vehicle apparatus 2 and the profile designated by the generated connection request is connectable (supported), the control unit 22 causes the BT module 24 to transmit the profile connection permission response signal to the BT module 5 via the BT communication line. If, on the other hand, the control unit 22 determines that the profile is unconnectable (unsupported), the control unit 22 causes the BT module 24 to transmit the profile connection rejection response signal to the BT module 5 via the BT communication line.

Further, if the control unit determines that the profile designated by the generated connection request requires the user operation on the mobile phone 3 in order to transmit the profile connection permission response signal or profile connection rejection response signal to the in-vehicle apparatus 2, the control unit 22 causes the display unit 25 to open a connection permission/rejection inquiry screen (not shown) to ask the user about whether the user permits or rejects to connect the profile. If the control unit 22 determines that the user has operated the key input unit 26 to give a permission to connect the profile, the control unit 22 causes the BT module 24 to transmit the profile connection permission response signal to the BT module 5 via the BT communication line. If, on the other hand, the control unit 22 determines that the user has operated the key input unit 26 to reject to connect the profile, the control unit 22 causes the BT module 24 to transmit the profile connection rejection response signal to the BT module 5 via the BT communication line.

If the control unit 4 of the in-vehicle apparatus 2 determines that the BT module 5 has received the profile connection permission response signal from the BT module 24 via the BT communication line, the control unit 4 initiates a profile connection process (acknowledgement of the connection request). When the profile connection process normally ends, the control unit 4 connects the profile between the BT module 5 and the BT module 24. If, on the other hand, the control unit 4 determines that the BT module 5 has received the profile connection rejection response signal from the BT module 24 via the BT communication line, or determines that a predetermined time has elapsed since the BT module 5 transmitted the profile connection request signal and that no signal has been received from the BT module 5 via the BT communication line during the predetermined time, the control unit 4 does not initiate the profile connection process (rejection of the connection request).

Figure 2:
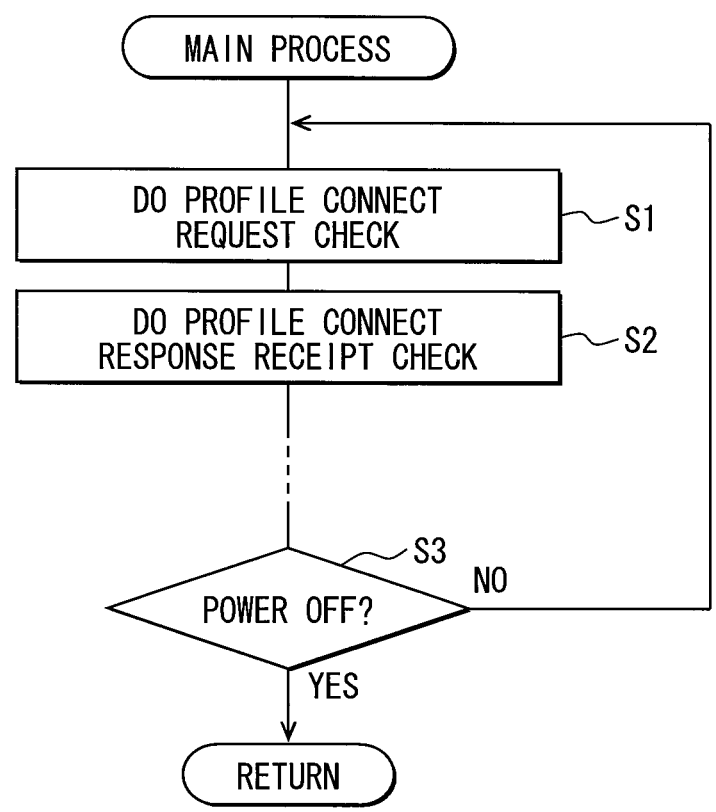
FIG. 2 is a flowchart illustrating a main process.
Figure 3:
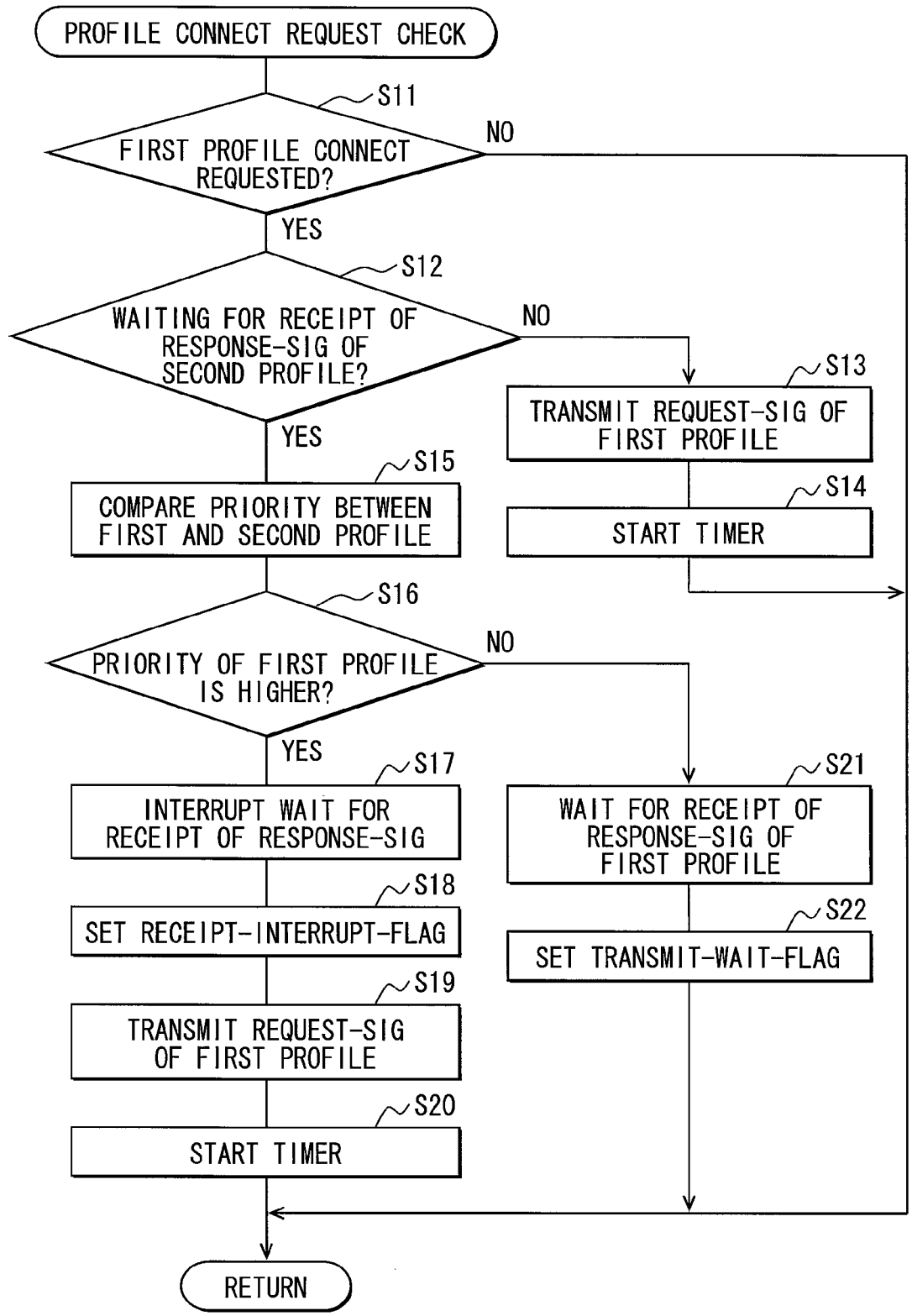
FIG. 3 is a flowchart illustrating a profile connection request check process.
Figure 4:
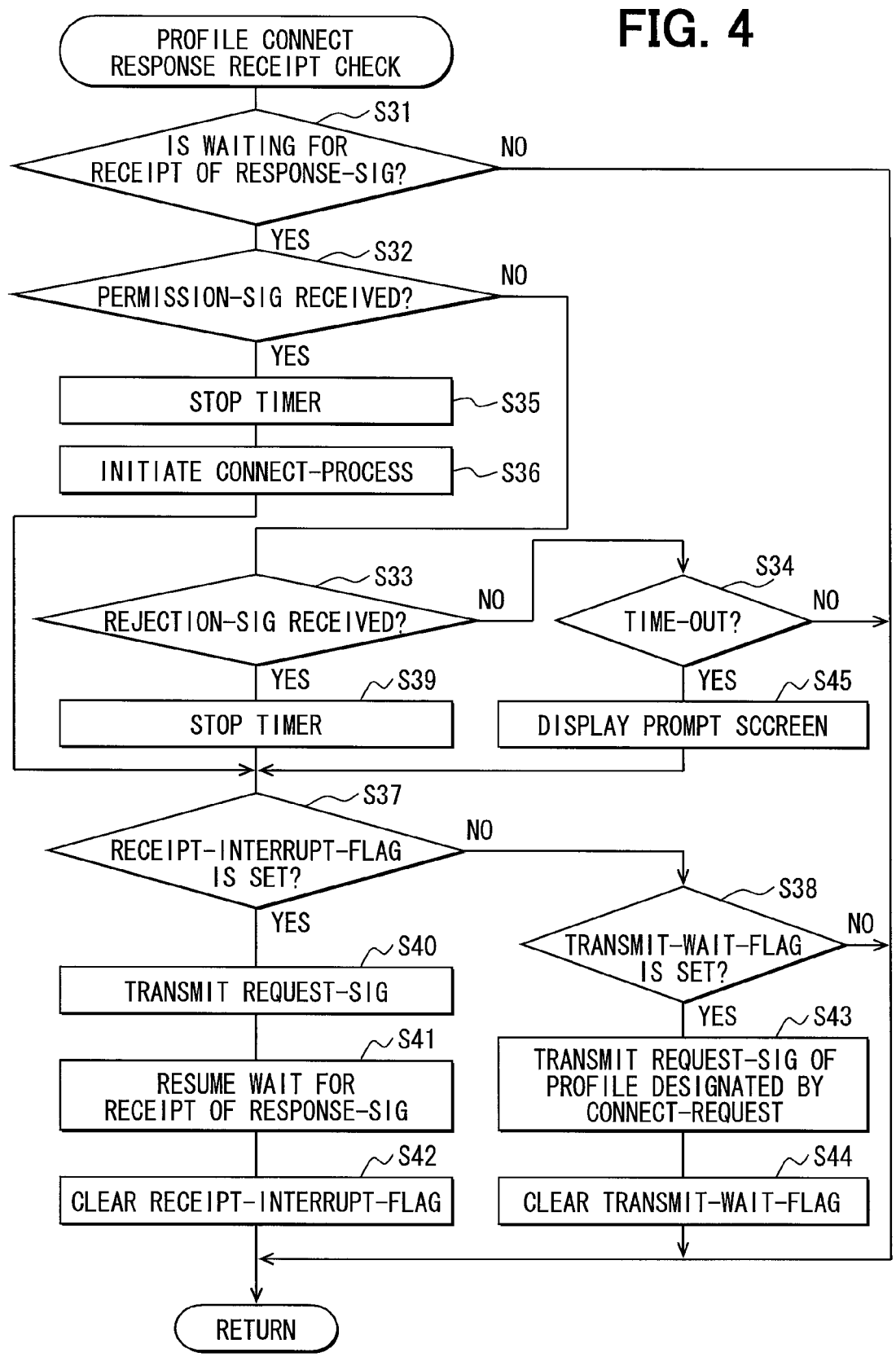
FIG. 4 is a flowchart illustrating a profile connection response signal check process.

Operations performed by the BT communication system 1 will now be more specifically described with reference to FIGS. 2 to 9. FIGS. 2 to 4 are flowcharts illustrating processes performed by the control unit 4 of the in-vehicle apparatus 2.

The control unit 4 of the in-vehicle apparatus 2 performs a main process while the apparatus power supply for the in-vehicle apparatus 2 is on (the ACC switch is on). Additionally, the control unit 4 performs a profile connection request check process and a profile connection response signal receipt check process as sub-processes of the main process. These processes will now be described in sequence.

(1) Main Process (See FIG. 2)

When the control unit 4 determines that the apparatus power supply of the in-vehicle apparatus 2 is turned on, the control unit 4 initiates the main process and then periodically performs the profile connection request check process and the profile connection response signal receipt check process at predetermined time intervals until the apparatus power supply is off (steps S1 to S3).

(2) Profile Connection Request Check Process (See FIG. 3)

When the process proceeds to the profile connection request check process from the main process, the control unit 4 initiates the profile connection request check process and determines whether a connection request of any profile is generated (step S11). If the control unit 4 determines that a connection request of a certain profile is generated (if the query in step S11 is answered "YES"), the control unit 4 determines whether the BT module 5 is waiting for receipt of a profile connection response signal (profile connection permission response signal or profile connection rejection response signal) of any other profile (step S12).

If the control unit 4 determines that the BT module 5 is not waiting for receipt of the profile connection response signal (profile connection permission response signal or profile connection rejection response signal) of any other profile (if the query in step S12 is answered "NO"), the control unit 4 causes the BT module 5 to transmit a profile connection request signal of the profile, which is designated by the generated connection request, to the BT module 24 via the BT communication line (step S13), starts up a timer function to count a predetermined time (e.g., 20 seconds) (step S14), terminates the profile connection request check process, and returns to the main process.

If the control unit 4 determines that the BT module 5 is waiting to receive the profile connection response signal of any other profile (if the query in step S12 is answered "YES"), the control unit 4 make a comparison between the priority level of the profile designated by the generated connection request and the priority level of the profile designated by the profile connection response signal that the BT module 5 is waiting to receive (step S15). It should be noted that since the priority levels of profiles are stored in the storage unit 7, the control unit 4 can make the above comparison by reading the priority levels stored in the storage unit 7.

If the control unit 4 determines that the profile designated by the generated connection request has a higher priority than the profile designated by the profile connection response signal that the in-vehicle apparatus 2 is waiting to receive (if the query in step S16 is answered "YES"), the control unit 4 causes the BT module 5 to interrupt waiting for the receipt of the profile connection response signal from the BT module 24 (step S17). The control unit 4 sets a receipt wait interrupt flag to indicate the interruption of the wait for the receipt of the profile connection response signal (step S18), causes the BT module 5 to transmit the profile connection request signal for the profile designated by the generated connection request to the BT module 24 via the BT communication line (step S19), starts up a timer function to start counting a predetermined time (e.g., 20 seconds) (step S20), terminates the profile connection request check process, and returns to the main process.

If the control unit 4 determines that the profile designated by the generated connection request does not have a higher priority than (has the same priority as or has a lower priority than) the profile designated by the profile connection response signal that the BT module 5 is waiting to receive (if the query in step S16 is answered "NO"), the control unit 4 causes the BT module 5 to continue waiting (without interrupting) for the receipt of the profile connection response signal from the BT module 24. The control unit 4 suspends transmission of the profile connection request signal of the profile designated by the generated connection request (step S21), sets a transmission suspension (wait) flag to indicate that the transmission of the profile connection request signal of the profile designated by the generated connection request is suspended (step S22), terminates the profile connection request check process, and returns to the main process.

(3) Profile Connection Response Signal Receipt Check Process (See FIG. 4)

When the process proceeds to the profile connection response signal receipt check process from the main process, the control unit 4 initiates the profile connection response signal receipt check process and determines whether the BT module 5 is waiting (in a state of waiting) for receipt of the connection response signal of the profile from the BT module 24 (step S31). If the control unit 4 determines that the BT module 5 is waiting (in a state of waiting) for receipt of the connection response signal of the profile from the BT module 24 (if the query in step S31 is answered "YES"), the control unit 4 determines whether the connection permission response signal of the profile is received, determines whether the connection rejection response signal of the profile is received, and determines whether the predetermined time, which is counted the timer function, has elapsed (whether a time-out has occurred) (steps S32 to S34). If the control unit 4 determines that the BT module 5 has received the connection permission response signal of the profile from the BT module 24 before the time-out, in other words, before the elapse of the predetermined time since the connection request signal of the profile was transmitted (if the query in step S32 is answered "YES"), the control unit 4 ends counting the predetermined time with use of the timer function (step S35). The control unit 4 then initiates the connection process of the profile (acknowledgement of the connection request) (step S36). When the profile connection process normally ends, the control unit 4 determines whether the receipt wait interrupt flag is set and determines whether the transmission wait flag is set (steps S37 and S38). If the connection process of the profile does not normally end (abnormally ends) after it started, the control unit 4 may cancel the profile connection request and then determine whether the receipt wait interrupt flag is set and whether the transmission wait flag is set.

If the control unit 4 determines that the BT module 5 has received the connection rejection response signal of the profile from the BT module 24 before the time-out, i.e., before the elapse of the predetermined time since the connection request signal of the profile was transmitted (if the query in step S33 is answered "YES"), the control unit 4 ends counting the predetermined time with use of the timer function (step S39). The control unit 4 then determines, without initiating the connection process of the profile (because the connection request is rejected), whether the receipt wait interrupt flag is set and whether the transmission wait flag is set (steps S37 and S38).

If the control unit 4 determines that the receipt wait interrupt flag is set, that is, the wait for the receipt of the connection response signal of the profile was interrupted (if the query in step S37 is answered "YES"), the control unit 4 causes the BT module 5 to transmit the connection request signal of the profile, which is associated with the interruption of the wait for receipt, to the BT module 24 (step S40). Then the control unit 4 resumes waiting for the receipt of the profile connection response signal (step S41), clears the receipt wait interrupt flag (step S42), ends the profile connection response signal receipt check process, and returns to the main process. In the above, if the user operates the mobile phone 3 and gives a profile connection permission after the BT module 24 receives the connection request signal of the profile from the BT module 5, the BT module 24 transmits the connection permission response signal of the profile to the BT module 5. If the user operates the mobile phone 3 and gives a profile connection rejection after the BT module 24 receives the connection request signal of the profile from the BT module 5, the BT module 24 transmits the connection rejection response signal of the profile to the BT module 5.

If the control unit 4 determines that (i) the BT module 5 has received the connection permission response signal of the profile or the connection rejection response signal of the profile from the BT module 24 before the time-out and (ii) the receipt wait interrupt flag is set (if the query in step S37 is answered "YES"), the control unit 4 may cause the BT module 5 to resume waiting for the receipt of the connection response signal of the profile, of which the wait for the receipt was interrupted, without causing the BT module 5 to transmit the connection request signal of the profile, of which the wait for its receipt was interrupted, to the BT module 24 (step S41).

In other words, in cases where the control unit 4 interrupts the wait for the receipt of the connection response signal of a certain profile, the control unit 4 may cause the BT module 5 to retransmit the connection request signal of the certain profile to the BT module 24 and subsequently resume the wait for the receipt of the connection response signal of the certain profile. Alternatively, since the connection request signal of a certain profile was already transmitted from the BT module 5 to the BT module 24 (before the interruption of the wait for the receipt of the connection response signal of the certain profile), the control unit 4 may cause the BT module 5 to resume the wait for the receipt of the connection response signal of the certain profile without causing the BT module 5 to retransmit the connection request signal of the certain profile, of which the wait for its receipt is interrupted, to the BT module 24.

Meanwhile, if the control unit 4 determines that the transmission wait flag is set, that is, the transmission of the connection request signal of the profile is awaited (if the query in step S38 is answered "YES"), the control unit 4 causes the BT module 5 to transmit the connection request signal of the profile, transmission of which is awaited, to the BT module 24 (step S43), cancels the transmission wait flag (step S44), ends the profile connection response signal receipt check process, and returns to the main process.

Figure 13:
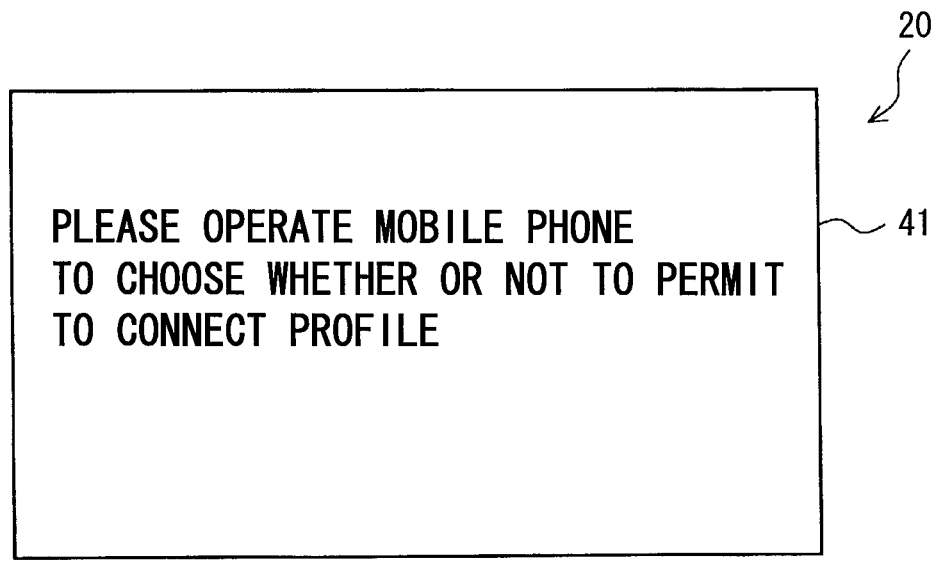
FIG. 13 is a diagram illustrating a selection operation prompt screen.

Further, if the control unit 4 determines that a time-out has occurred, that is, the BT module 5 has received neither the profile connection permission response signal nor the profile connection rejection response signal from the BT module 24 within the predetermined time after the transmission of the profile connection request signal (if the query in step S34 is answered "YES"), the control unit 4 causes the display unit 20 to open a selection operation prompt screen 41 (corresponding to a notification) and display, for example, the message such "OPERATE THE MOBILE PHONE TO CHOOSE WHETHER OR NOT TO PERMIT TO CONNECT THE PROFILE" as shown in FIG. 13 (step S45). Additionally, the control unit 4 performs steps S37, S38 and subsequent steps. Thereafter, the control unit 4 ends the profile connection response signal receipt check process and returns to the main process. To prevent the user from operating the mobile phone 3 during driving the vehicle, it is preferred that the control unit 4 open the selection operation prompt screen 41 when the vehicle is making a stop.

The above-described series of operations will now be described more specifically with reference to three different cases. In a first case, a PBAP connection response signal (PBAP connection permission response signal or PBAP connection rejection response signal) is transmitted from the mobile phone 3 to the in-vehicle apparatus 2 during a time interval between a time at which a PBAP connection request signal is transmitted from the in-vehicle apparatus 2 to the mobile phone 3 and a time at which the connection request for a certain profile is generated. In a second case, the connection request for the SPP, which is a profile having a higher priority than the PBAP, is generated during a time interval between a time at which the PBAP connection request signal is transmitted from the in-vehicle apparatus 2 to the mobile phone 3 and a time at which the PBAP connection response signal is received from the mobile phone 3. In a third case, the connection request for the AVRCP, which is a profile having a lower priority than the PBAP, is generated during a time interval between a time at which the PBAP connection request signal is transmitted from the in-vehicle apparatus 2 to the mobile phone 3 and a time at which the PBAP connection response signal is received from the mobile phone 3.

Figure 5:
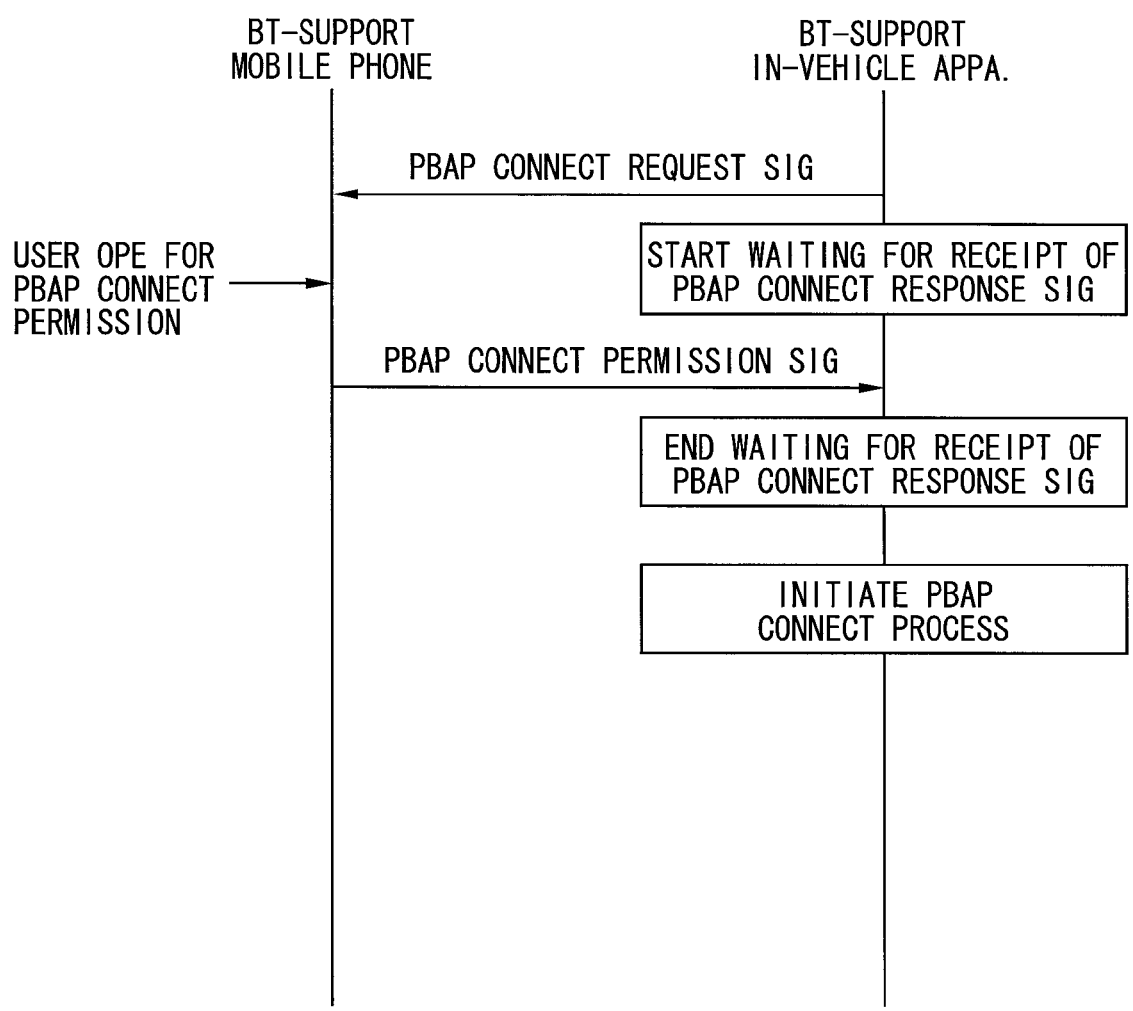
FIG. 5 is a sequence diagram of a first exemplary case.

(a) Explanation on the first case where the PBAP connection response signal is transmitted from the mobile phone 3 to the in-vehicle apparatus 2 during the time interval between the time at which the PBAP connection request signal is transmitted from the in-vehicle apparatus 2 to the mobile phone 3 and the time at which the connection request for a certain profile is generated After the BT module 5 transmits the PBAP connection request signal to the BT module 24, the control unit 4 causes the BT module 5 to start waiting for the receipt of the PBAP connection response signal from the BT module 24. In this instance, As shown in FIG. 5, if the PBAP connection permission response signal is transmitted from the BT module 24 in response to a user operation on the key input unit 26 of the mobile phone 3 to give a permission to connect the PBAP, the PBAP connection permission response signal is transmitted to the BT module 5. Thereafter, if the control unit 4 determines that the BT module 5 has received the PBAP connection permission response signal, the control unit 4 causes the BT module 5 to ends waiting for the receipt of the PBAP connection response signal from the BT module 24, and initiates a PBAP connection process (acknowledgement of the connection request of the PBAP).

Figure 6:
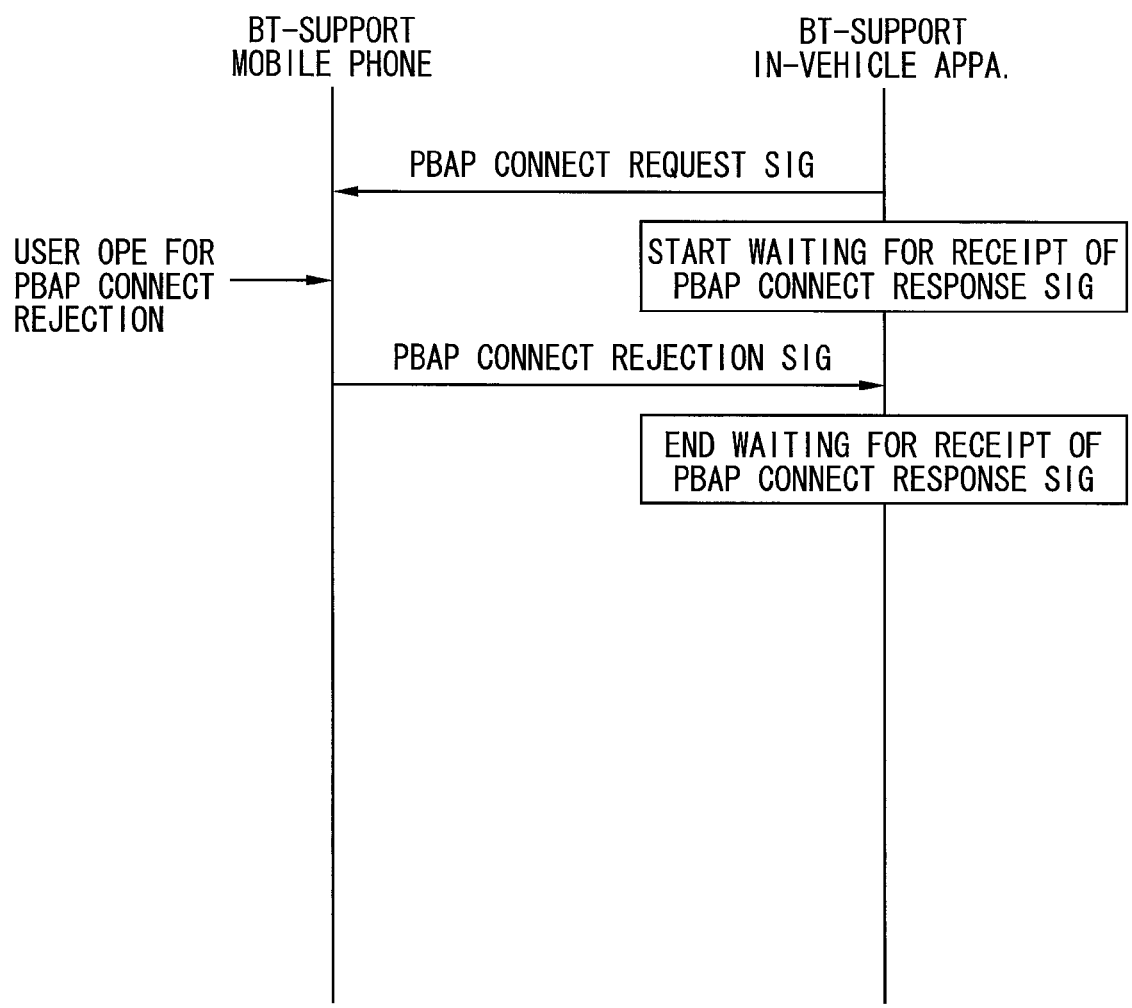
FIG. 6 is a sequence diagram of a second exemplary case.

As shown in FIG. 6, if the PBAP connection rejection response signal is transmitted from the BT module 24 in response to a user operation on the key input unit 26 of the mobile phone 3 giving a rejection to connect the PBAP, the PBAP connection rejection response signal is transmitted to the BT module 5. If the control unit 4 determines that the BT module 5 has received the PBAP connection rejection response signal, the control unit 4 causes the BT module 5 to end waiting for the receipt of the PBAP connection response signal from the BT module 24, and does not initiate the PBAP connection process (rejection of the connection request of the PBAP).

(b) Explanation on the second case where the connection request of the SPP, which is a profile having a higher priority than the PBAP, is generated during the time interval between the time at which the PBAP connection request signal is transmitted from the in-vehicle apparatus 2 to the mobile phone 3 and the time at which the PBAP connection response signal is received from the mobile phone 3

Figure 7:
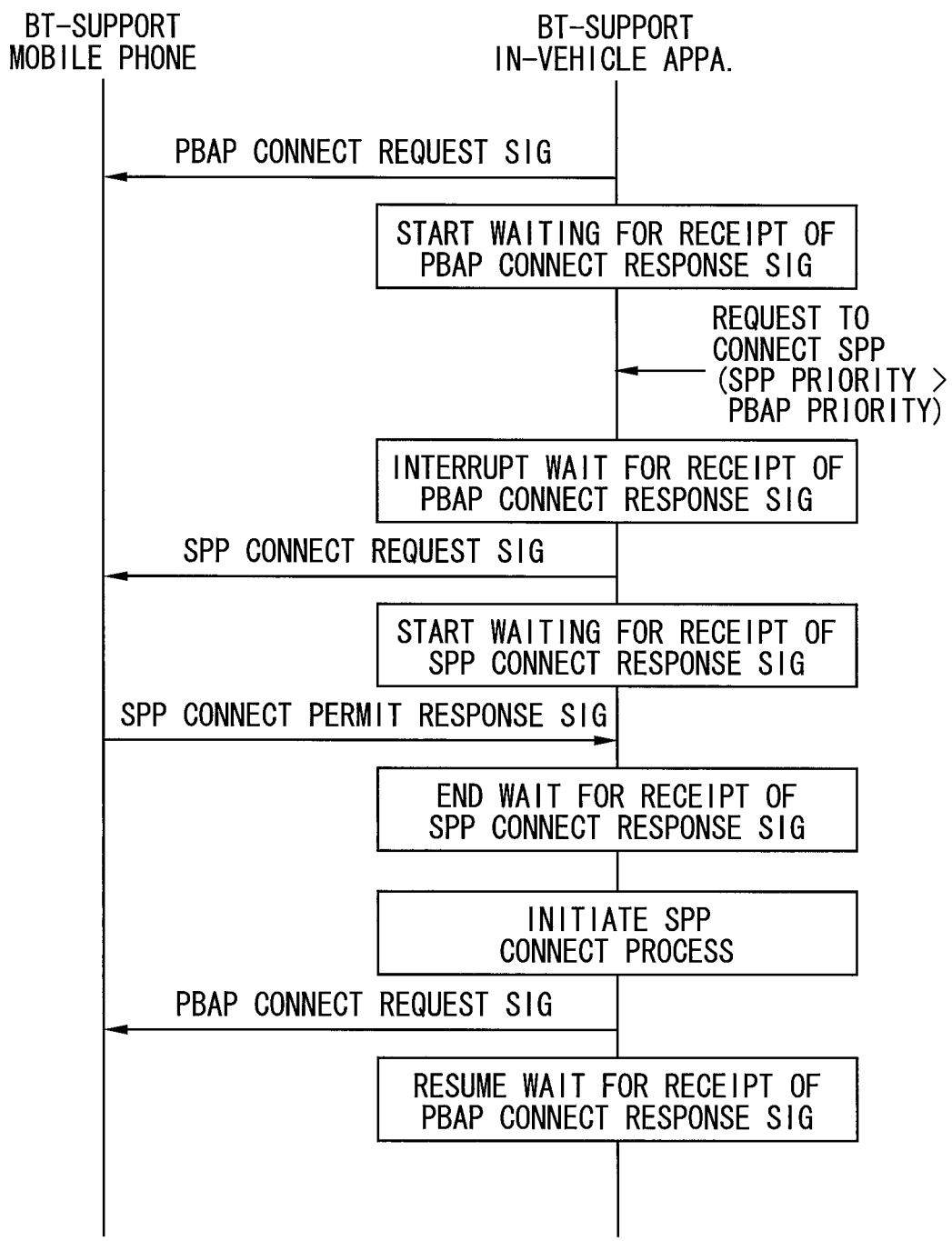
FIG. 7 is a sequence diagram of a third exemplary case.
Figure 8:
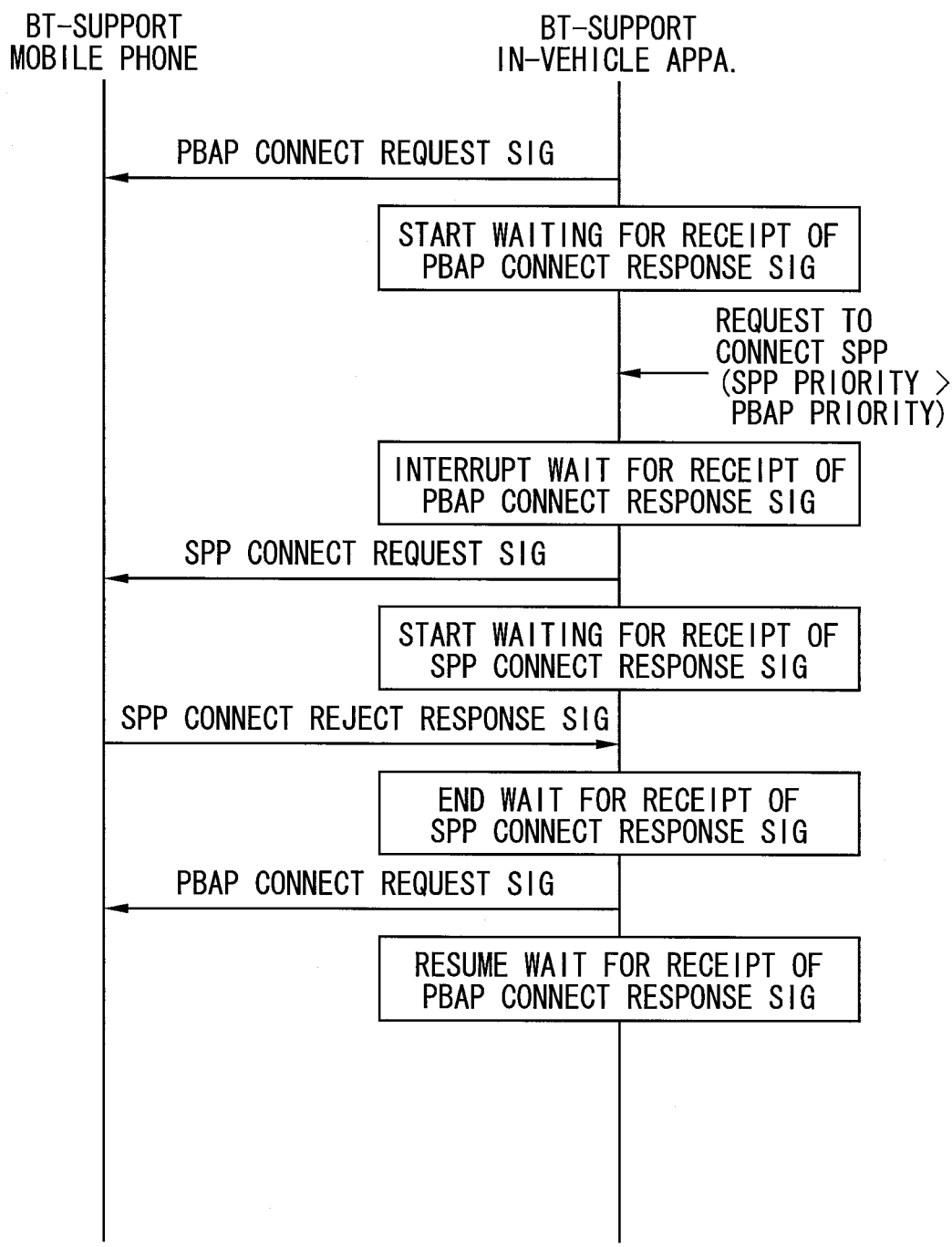
FIG. 8 is a sequence diagram of a fourth exemplary case.
Figure 9:
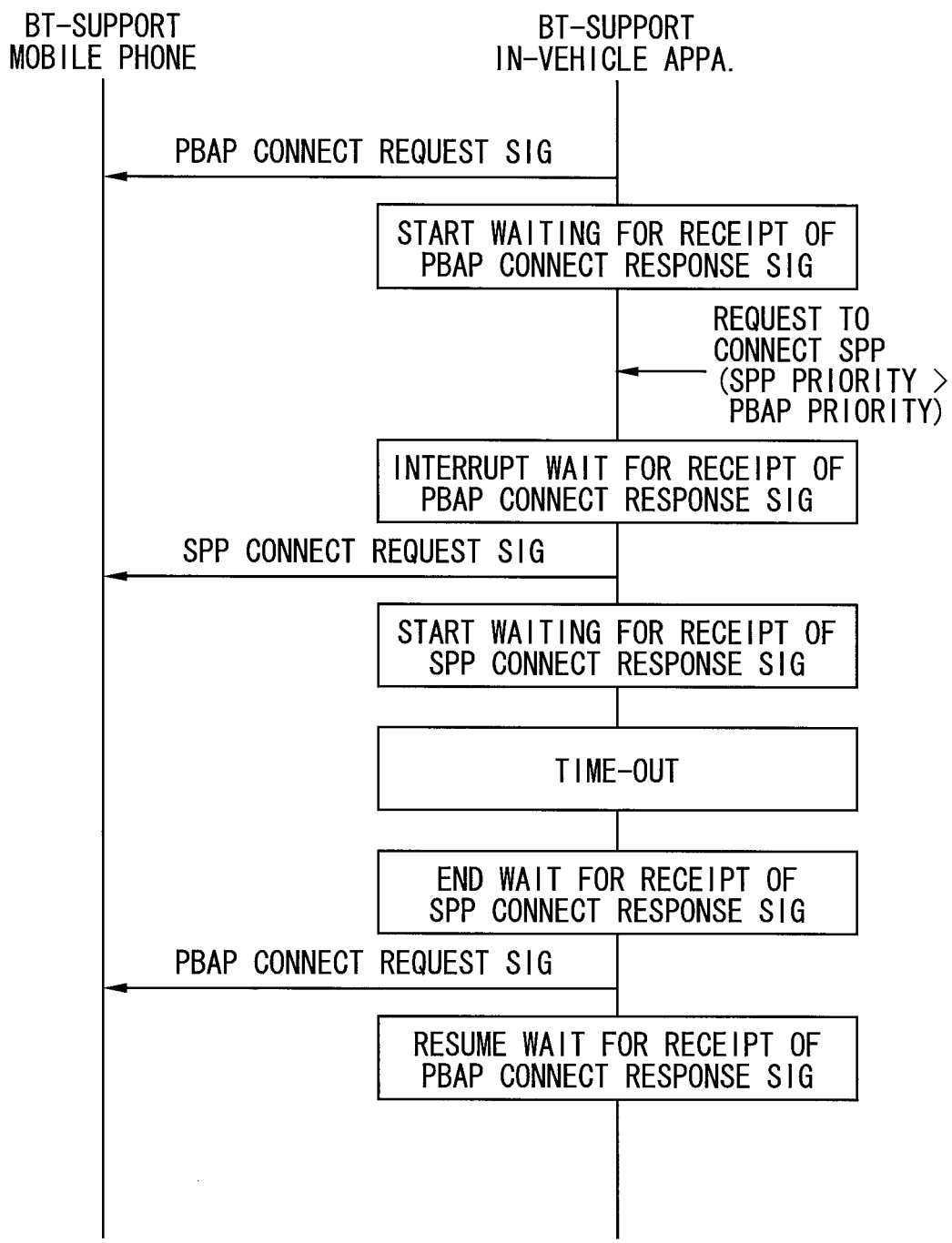
FIG. 9 is a sequence diagram of a fifth exemplary case.

After the BT module 5 transmits the PBAP connection request signal to the BT module 24, the control unit 4 causes the BT module 5 to start waiting for the receipt of the PBAP connection response signal from the BT module 24. In this instance, as shown in FIGS. 7 to 9, the control unit 4 may determine that a connection request of the SPP, which has a higher priority than the PBAP, is generate, before a user operation on the mobile phone 3 to give a permission or a rejection to connect the PBAP is performed, that is, before the PBAP connection permission response signal or the PBAP connection rejection response signal is received by the BT module 5. In this case, the control unit 4 causes the BT module 5 to interrupt the wait for the receipt of the PBAP connection response signal from the BT module 24, and causes the BT module 5 to transmit an SPP connection request signal to the BT module 24.

Thereafter, the control unit 4 causes the BT module 5 to start waiting for the receipt of an SPP connection response signal (SPP connection permission response signal or SPP connection rejection response signal) from the BT module 24. Thereafter, as shown in FIG. 7, if the mobile phone 3 is configured to automatically acknowledge the connection request of the SPP, the BT module 24 automatically transmits the SPP connection permission response signal. If the control unit 4 determines that the BT module 5 has received the SPP connection permission response signal, the control unit 4 causes the BT module 5 to end waiting for the receipt of the SPP connection response signal from the BT module 24. Next, the control unit 4 initiates the SPP connection process (acknowledgement of the connection request of the SPP), connects the SPP between the BT module 24 and the BT module 5, causes the BT module 5 to retransmit the PBAP connection request signal to the BT module 24, and causes the BT module 5 to resume the wait for the receipt of the PBAP connection response signal from the BT module 24.

As shown in FIG. 8, if the mobile phone 3 is configured to reject the connection request of the SPP, the SPP connection rejection response signal is automatically transmitted from the BT module 24. In this case, the control unit 4 determines that the BT module 5 has received the SPP connection rejection response signal. Additionally, the control unit 4 causes the BT module 5 to end the wait for the receipt of the SPP connection response signal from the BT module 24. Moreover, the control unit 4 rejects the connection request of the SPP, causes the BT module 5 to retransmit the PBAP connection request signal to the BT module 24 without initiating the SPP connection process, and causes the BT module 5 to resume the interrupted wait for the receipt of the PBAP connection response signal from the BT module 24.

As shown in FIG. 9, if the SPP connection response signal is not transmitted from the BT module 24 for some reason, the BT module 5 fails to receive the SPP connection response signal within the predetermined time after the transmission of the SPP connection request signal from the BT module 5. In this case, the control unit 4 determines that the BT module 5 has not received the SPP connection response signal although the predetermined time has elapsed since the SPP connection request signal was transmitted from the BT module 5, the control unit 4 also causes the BT module 5 to end the wait for the receipt of the SPP connection response signal from the BT module 24. Additionally, the control unit 4 causes the BT module 5 to retransmit the PBAP connection request signal to the BT module 24 without initiating the SPP connection process, and causes the BT module 5 to resume the interrupted wait for the receipt of the PBAP connection response signal from the BT module 24.

(c) Explanation on the third case where the connection request of the AVRCP, which is a profile having a lower priority than the PBAP, is generated during the time interval between the time at which the PBAP connection request signal is transmitted from the in-vehicle apparatus 2 to the mobile phone 3 and the time at which the PBAP connection response signal is received from the mobile phone 3

Figure 10:
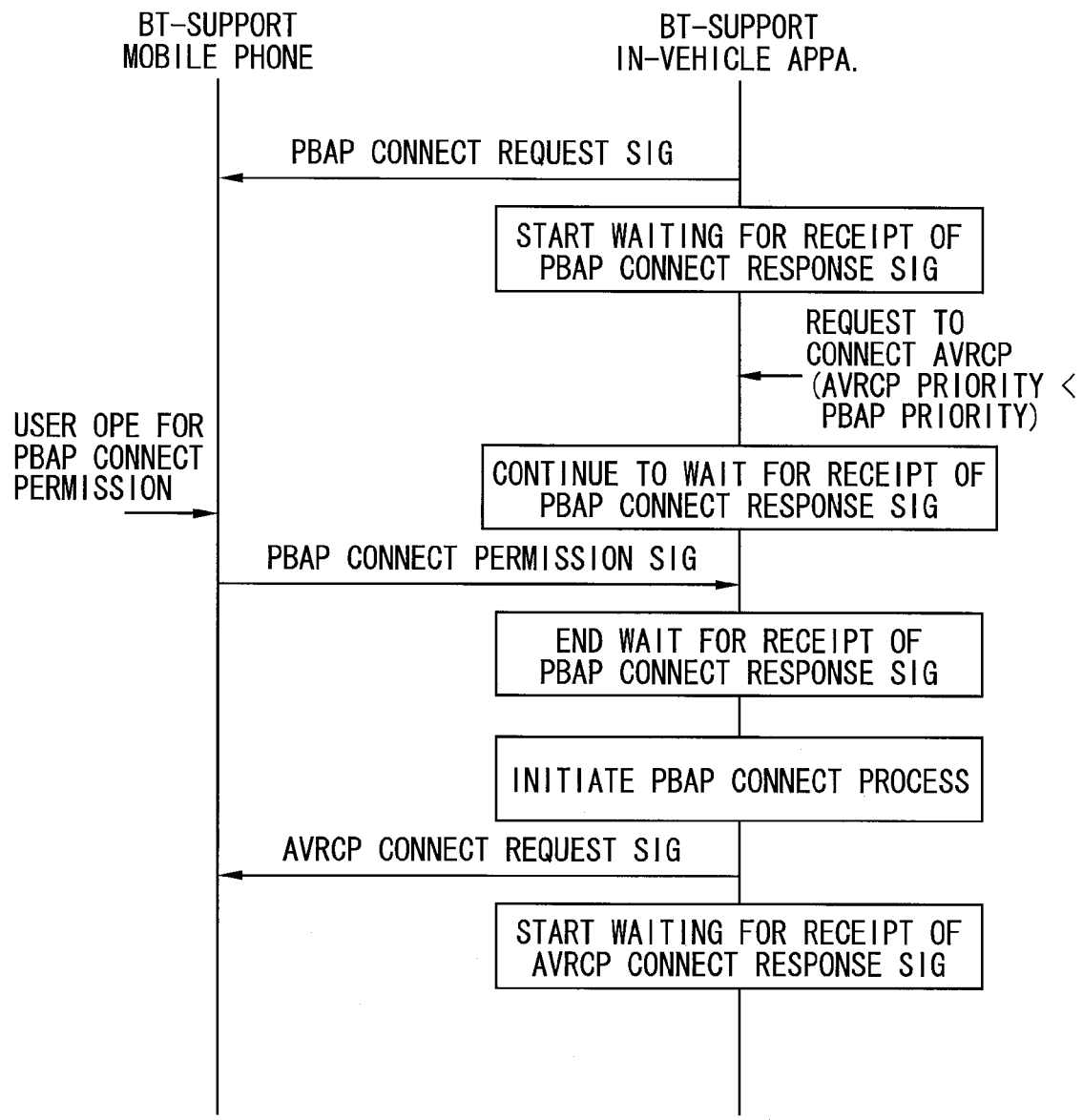
FIG. 10 is a sequence diagram of a sixth exemplary case.
Figure 11:
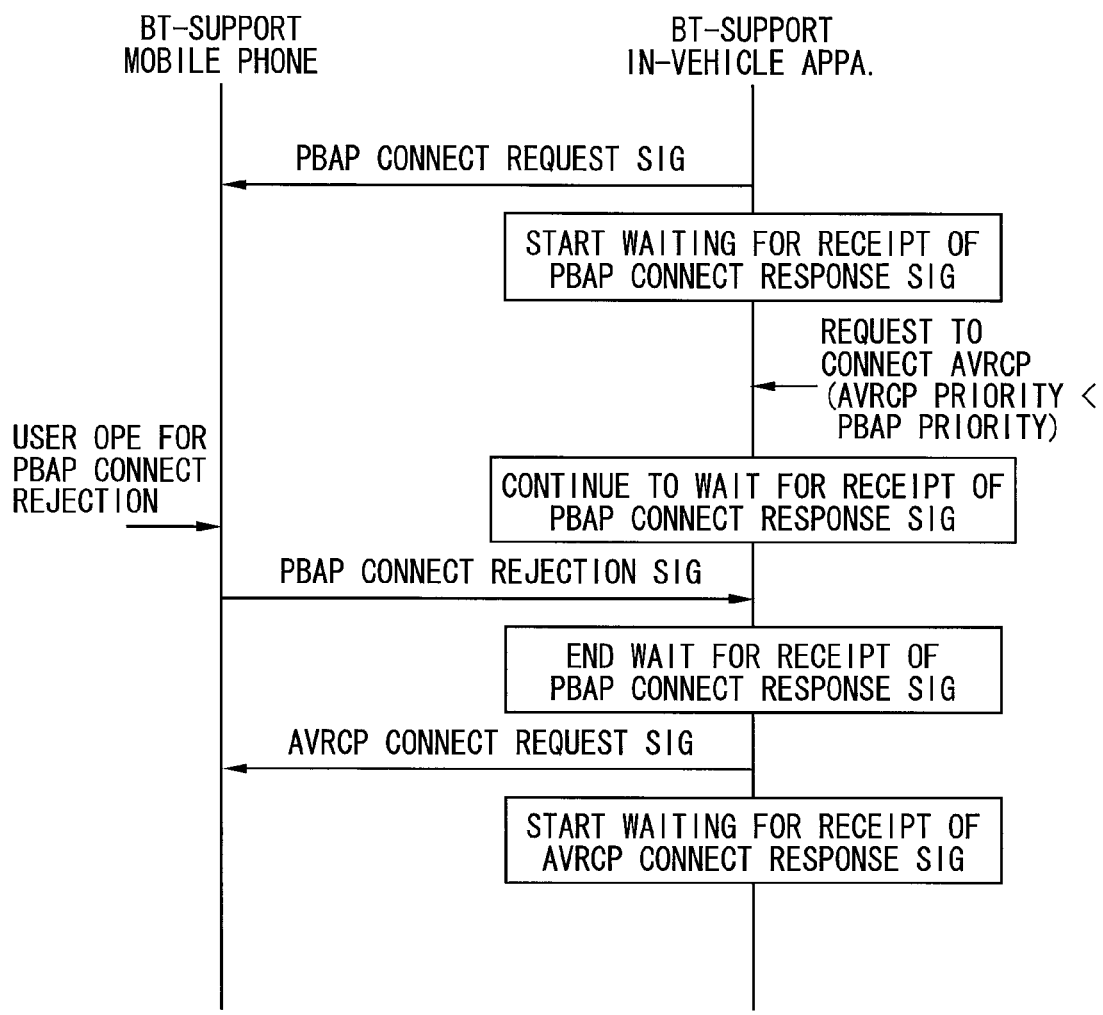
FIG. 11 is a sequence diagram of a seventh exemplary case.
Figure 12:
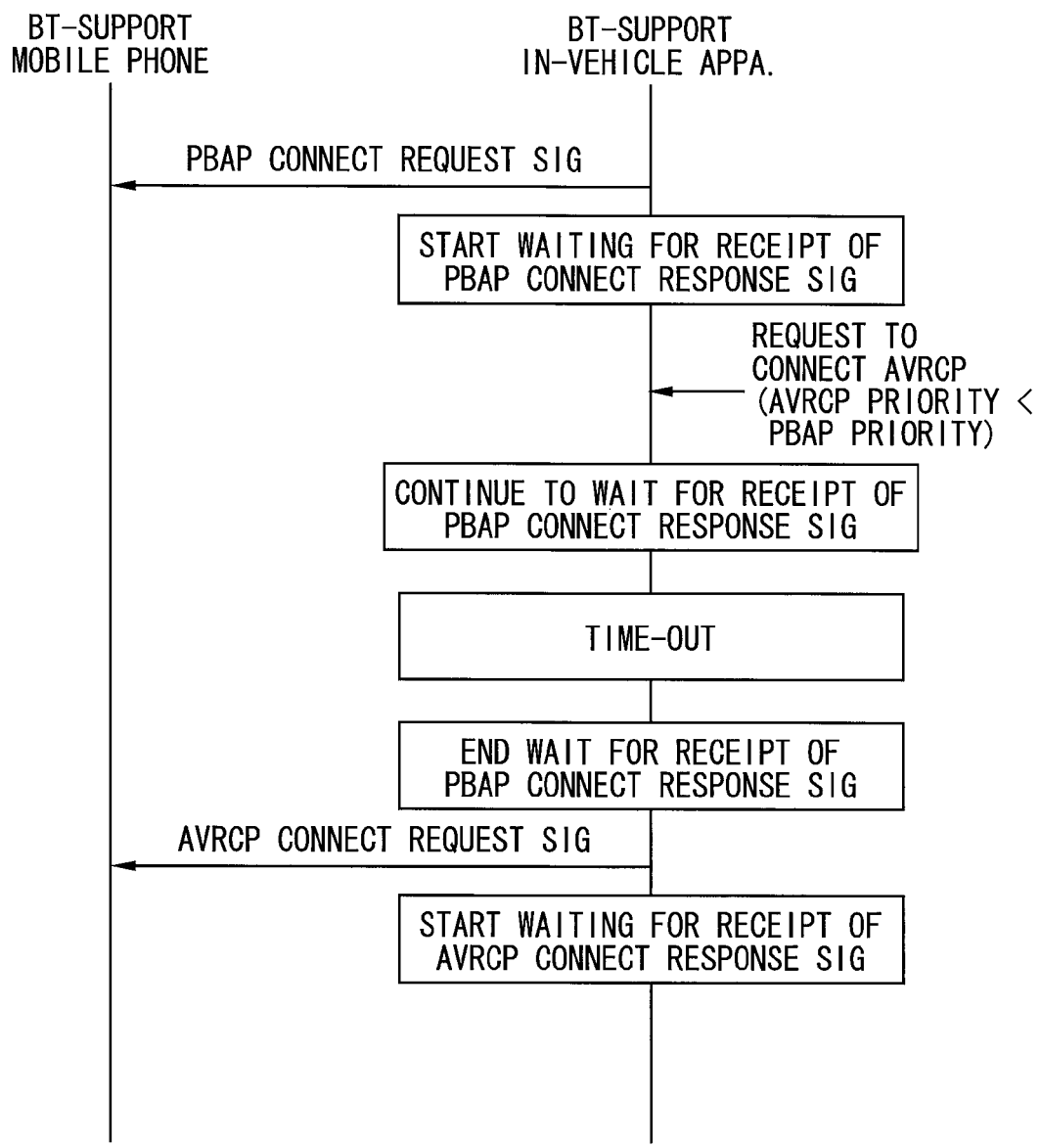
FIG. 12 is a sequence diagram of an eighth exemplary case.

After the BT module 5 transmits the PBAP connection request signal to the BT module 24, the control unit 4 starts waiting for the receipt of the PBAP connection response signal from the BT module 24. As shown in FIGS. 10 to 12, if the control unit 4 determines that the connection request of the AVRCP, which has a lower priority than the PBAP, is generated before an user operation on the key input unit 26 of the mobile phone 3 to give a connection permission or a connection rejection is performed, that is, before the PBAP connection permission response signal or the PBAP connection rejection response signal is received by the BT module 5, the control unit 4 causes the BT module 5 to continue (without interrupting) waiting for the receipt of the PBAP connection response signal from the BT module 24.

As shown in FIG. 10, if a user operation on the key input unit 26 of the mobile phone 3 to permit to connect the PBAP is performed, the PBAP connection permission response signal is transmitted from the BT module 24. Additionally, the control unit 4 determines that the BT module 5 has received the PBAP connection permission response signal. In response, the control unit 4 causes the BT module 5 to end the wait for the receipt of the PBAP connection response signal from the BT module 24. The control unit 4 then initiates the PBAP connection process, causes the BT module 5 to transmit an AVRCP connection request signal to the BT module 24, and causes the BT module 5 to start to wait for the receipt of an AVRCP connection response signal from the BT module 24.

As shown in FIG. 11, if a user operation on the key input unit 26 of the mobile phone 3 to reject the connection of the PBAP is performed, the PBAP connection rejection response signal is transmitted from the BT module 24, and additionally, the control unit 4 determines that the BT module 5 has received the PBAP connection rejection response signal. In response, the control unit 4 ends the BT module 5 to end the wait for the receipt of the PBAP connection response signal from the BT module 24. The control unit 4 then causes the BT module 5 to transmit the AVRCP connection request signal to the BT module 24 and causes the BT module 5 to start waiting for the receipt of the AVRCP connection response signal from the BT module 24.

As shown in FIG. 12, the PBAP connection response signal may not be transmitted from the BT module 24 for some reason. In this case, the control unit 4 may determine that the BT module 5 has not received the PBAP connection response signal although the predetermined time has elapsed since the PBAP connection request signal was transmitted from the BT module 5. In response, the control unit 4 also causes the BT module 5 to end the wait for the receipt of the PBAP connection response signal from the BT module 24. Additionally, the control unit 4 causes the BT module 5 to transmit the AVRCP connection request signal to the BT module 24 without initiating the PBAP connection process, and causes the BT module 5 to start waiting for the receipt of the AVRCP connection response signal from the BT module 24.

As can be seen, in the present embodiment, if the connection request for a high priority profile is generated when the in-vehicle apparatus 2 is waiting for the receipt of the profile connection response signal of a low, priority profile, the in-vehicle apparatus 2 interrupts the wait for the receipt of the connection response signal of the low-priority profile and transmits the profile connection request signal of the high-priority profile. Therefore, the transmission of the profile connection request signal of the high-priority profile can be given priority over the wait for the receipt of the profile connection response signal of the low-priority profile. Thus, when the profile connection permission response signal of the high-priority profile is received after the transmission of the profile connection request signal of the high-priority profile, the profile connection process of the high-priority profile can be immediately initiated. This makes it possible to properly meet a user request to promptly use a function offered by the high-priority profile.

Further, if the connection request of a low-priority profile is generated while the in-vehicle apparatus 2 is waiting for the receipt of the profile connection response signal of a high-priority profile, the in-vehicle apparatus 2 continues, without interrupting, waiting for the receipt of the profile connection response signal of the high-priority profile. Therefore, the wait for the receipt of the profile connection response signal of the high-priority profile can be given priority over the transmission of a profile connection request signal of the low-priority profile.

Moreover, if the in-vehicle apparatus 2 continues waiting for the receipt of a profile connection response signal for the predetermined time and the predetermined time has elapsed without receipt of the profile connection response signal, the selection operation prompt screen 41 is displayed to indicate that the predetermined time has elapsed without receipt of the profile connection response signal. This makes it possible to prompt the user to perform a procedure for choosing whether or not to acknowledge the profile connection request.

Embodiments of the present disclosure are not limited to the above embodiments and can be combined, modified or expanded in various ways, examples of which will be described below.

The short-range wireless communication apparatus need not always be the in-vehicle apparatus 2 but may be a navigation apparatus having a navigation function and other apparatuses, as far as the short-range wireless communication apparatus includes a BT module having a function corresponding to that of the BT module 5. Additionally, the short-range wireless communication apparatus may be an apparatus that is not mounted on a vehicle. The communication destination apparatus, which is a data communication destination for the short-range wireless communication apparatus, need not always be the mobile phone 3. The communication destination apparatus may be a mobile information terminal or the like as far as it includes a BT module having a function corresponding to that of the BT module 24. The communication destination apparatus may be a fixed terminal, which may not be portable by the user.

The manner of prompting the user to perform a procedure for choosing whether or not to acknowledge a profile connection request is not limited to such a visual manner of opening the selection operation prompt screen 41. An alternative may be such an auditory manner of outputting a relevant audio guidance or a combination of the visual manner and the auditory manner.

In the above-described embodiment, if the time-out occurs, that is, if it is determined that although the predetermined time has elapsed since the transmission of a profile connection request signal was transmitted, a profile connection response signal has not been received within the predetermined time, the selection operation prompt screen 41 is displayed to prompt the user to perform the procedure for choosing whether or not to acknowledge a profile connection request. In addition or in place of the above, if it is determined that the wait for the receipt of the profile connection response signal is interrupted, a notification about this may be sent to the user. In addition or in place of the above, if it is determined that the number of times the wait for the receipt of the profile connection response signal is interrupted reaches a predetermined number of times, a notification about this may be sent to the user.

For each profile, the priority levels of the profiles can be set. For example, when the priority levels of the PBAP and OPP are set higher than those of the other profiles, the transfer of phone book data is given priority over the functions of the other profiles. Further, when, for instance, the priority levels of the A2DP and AVRCP are set higher than those of the other profiles, the transfer of sound data (music data) stored in the mobile phone 3 is given priority over the functions of the other profiles.

The present disclosure has various aspects. For example, according to a first aspect, a short-range wireless communication apparatus can be configured as follows. The short-range wireless communication apparatus comprises an own connection device and a control device. The own connection device is capable of connecting a communication protocol to a communication destination side connection device. In cases where the communication destination side connection device receives a connection request signal of the communication protocol via a short-range wireless communication line, the communication destination side connection device transmits a connection permission response signal or a connection rejection response signal of the communication protocol via the short-range wireless communication line in accordance with a user operation. The communication protocol includes a first communication protocol and a second communication protocol. After transmitting the connection request signal of the first communication protocol to the communication destination side connection device via the short-range wireless communication line, the own connection device waits for receipt of the connection permission response signal or the connection rejection response signal of the first communication protocol. When the control device determines that a request to connect the second communication protocol is generated while the own connection device is waiting for receipt of the connection permission response signal or the connection rejection response signal of the first communication protocol, the control device causes the own connection device to interrupt waiting for the receipt of the connection permission response signal and the connection rejection response signal of the first communication protocol from the communication destination side connection device, and additionally, the control device causes the own connection device to transmit the connection request signal of the second communication protocol to the communication destination side connection device via the short-range wireless communication line.

According to the above short-range wireless communication apparatus, if the request to connect the second communication protocol is generated while the own connection device is waiting for receipt of the connection permission response signal or the connection rejection response signal of the first communication protocol, the own connection device interrupts waiting for the receipt of the connection permission response signal and the connection rejection response signal of the first communication protocol from the communication destination side connection device, and additionally, the own connection device transmits the connection request signal of the second communication protocol to the communication destination side connection device via the short-range wireless communication line. Thereafter, upon receipt of the connection permission response signal of the second communication protocol, the short-range wireless communication apparatus can promptly initiate a connection process of connecting the second communication protocol. Therefore, it becomes possible to properly meet a user request to promptly use a function of the second communication protocol.

The above short-range wireless communication apparatus may be configured as follows. When the control device determines that priority level of the second communication protocol is higher than that of the first communication protocol, the control device causes the own connection device to interrupt waiting for the receipt of the connection permission response signal and the connection rejection response signal of the first communication protocol, and additionally, the control device causes the own connection device to transmit the connection request signal of the second communication protocol to the communication destination side connection device via the short-range wireless communication line.

According to the above configuration, the priority levels of the communication protocols are settable in advance. Accordingly, the transmission of the connection request signal of the second communication protocol having a high priority can give priority over the wait for the receipt of the connection permission response signal or connection rejection response signal of the first communication protocol having a low priority.

The above short-range wireless communication apparatus may be configured as follows. After the own connection device (i) interrupts waiting for the receipt of the connection permission response signal and the connection rejection response signal of the first communication protocol and (ii)

transmits the connection request signal of the second communication protocol to the communication destination side connection device via the short-range wireless communication line, the control device may determine that the own connection device receives the connection permission response signal of the second communication protocol or the connection rejection response signal of the second communication protocol. In this case, the control device causes the own connection device to transmit the connection request signal of the first communication protocol to the communication destination side connection device via the short-range wireless communication line.

According to the above configuration, upon receipt of the connection permission response signal or connection rejection response signal of the second communication protocol, the short-range wireless communication apparatus can transmit the connection request signal of the first communication protocol without persistently interrupting the wait for the receipt of the connection permission response signal or connection rejection response signal of the first communication protocol. Thus, the short-range wireless communication apparatus can prompt the communication destination side connection device to transmit the connection permission response signal or connection rejection response signal of the first communication protocol. As a result, the short-range wireless communication apparatus can immediately resume the wait for the receipt of the connection permission response signal or connection rejection response signal of the first communication protocol.

The above short-range wireless communication apparatus may be configured as follows. When the control device determines that after the own connection device interrupts waiting for the receipt of the connection permission response signal of the first communication protocol and the connection rejection response signal of the first communication protocol and transmits the connection request signal of the second communication protocol to the communication destination side connection device via the short-range wireless communication line, a connection process of connecting the second communication protocol is successfully or abnormally ended, the control device causes the own connection device to transmit the connection request signal of the first communication protocol to the communication destination side connection device via the short-range wireless communication line.

According to the above configuration, when the connection process of the second communication protocol is successfully or abnormally ended, the short-range wireless communication apparatus can transmit the connection request signal of the first communication protocol without persistently interrupting the wait for the receipt of the connection permission response signal or connection rejection response signal of the first communication protocol. Thus, the short-range wireless communication apparatus can prompt the communication destination side connection device to transmit the connection permission response signal or connection rejection response signal of the first communication protocol, and can immediately resume the wait for the receipt of the connection permission response signal or connection rejection response signal of the first communication protocol.

The above short-range wireless communication apparatus may be configured as follows. When the control device determines that, after the own connection device interrupts waiting for the receipt of the connection permission response signal and the connection rejection response signal of the first communication protocol and transmits the connection request signal of the second communication protocol to the communication destination side connection device via the short-range wireless communication line, the own connection device receives the connection permission response signal of the second communication protocol or the connection rejection response signal of the second communication protocol, the control device causes the own connection device to resume waiting for receipt of the connection permission response signal and the connection rejection response signal of the first communication protocol.

According to the above configuration, upon receipt of the connection permission response signal or connection rejection response signal of the second communication protocol, the short-range wireless communication apparatus can immediately resume the wait for the receipt of the connection permission response signal or connection rejection response signal of the first communication protocol without persistently interrupting the wait for the receipt of the connection permission response signal or connection rejection response signal of the first communication protocol, even if the short-range wireless communication apparatus does not transmit the connection request signal of the first communication protocol.

The above short-range wireless communication apparatus may be configured as follows. When the control device determines that priority level of the second communication protocol is lower than that of the first communication protocol, the control device causes the own connection device to continue, without interrupting, waiting for the receipt of the connection permission response signal and the connection rejection response signal of the first communication protocol from the communication destination side connection device.

According to the above configuration, the priority levels of the communication protocols are settable in advance. Accordingly, the wait for the receipt of the connection permission response signal or connection rejection response signal of the first communication protocol having a high priority can give priority over the transmission of the connection request signal of the second communication protocol having a low priority.

The above short-range wireless communication apparatus may be configured as follows. When the control device determines that after the own connection device continues, without interrupting, waiting for the receipt of the connection permission response signal and the connection rejection response signal of the first communication protocol from the communication destination side connection device, the own connection device receives the connection permission response signal of the first communication protocol or the connection rejection response signal of the first communication protocol from the communication destination side connection device, the control device causes the own connection device to transmit the connection request signal of the second communication protocol to the communication destination side connection device via the short-range wireless communication line.

According to the above configuration, upon receipt of the connection permission response signal or connection rejection response signal of the first communication protocol, the connection request signal of the second communication protocol having a low priority can be immediately transmitted without persistently suspending the transmission of the connection request signal of the second communication protocol.

The above short-range wireless communication apparatus may be configured as follows. The control device causes a notification device to output a notification about the user operation if the control device determines that both the following two conditions are satisfied. A first condition is that a predetermined time has elapsed since the own connection device transmitted the connection request signal of the first communication protocol via the short-range communication line and started to wait for the receipt of the connection permission response signal or the connection rejection response signal of the first communication protocol from the communication destination side connection device. A second condition is that the own connection device fails to receive the connection permission response signal or the connection rejection response signal of the first communication protocol from the communication destination side connection device during the predetermined time.

According to the above configuration, the short-range wireless communication apparatus can notify a user that the connection permission response signal or connection rejection response signal of the first communication protocol has not been received for a predetermined period of time. This makes it possible to prompt the user to perform a procedure for initiating the transmission of the connection permission response signal or connection rejection response signal of the first communication protocol, that is, a procedure for choosing whether or not to acknowledge a connection request of the first communication protocol.

It should be noted that the present disclosure is intended to cover various modification and equivalent arrangements. In addition, while the various combinations and configurations, other combinations and configurations, including more, less or only a single element, are also within the spirit and scope of the present disclosure.

What is claimed is:

1. A short-range wireless communication apparatus comprising:
   a own connection device that is capable of connecting a communication protocol including a first communication protocol and a second communication protocol to a communication destination side connection device that, upon receipt of a connection request signal of the communication protocol via a short-range wireless communication line, transmits a connection permission response signal of the communication protocol or a connection rejection response signal of the communication protocol via the short-range wireless communication line in accordance with a user operation; and
   a control device that, when determining that a request to connect the second communication protocol is generated while the own connection device is waiting for receipt of the connection permission response signal of the first communication protocol or the connection rejection response signal of the first communication protocol after transmission of the connection request signal of the first communication protocol from the own connection device to the communication destination side connection device via the short-range wireless communication line,
   stops the own connection device from waiting for the receipt of the connection permission response signal of the first communication protocol or the connection rejection response signal of the first communication protocol from the communication destination side connection device and
   causes the own connection device to transmit the connection request signal of the second communication protocol to the communication destination side connection device via the short-range wireless communication line.

2. The short-range wireless communication apparatus according to claim 1, wherein
   when the control device determines that priority level of the second communication protocol is higher than that of the first communication protocol, the control device stops the own connection device from waiting for the receipt of the connection permission response signal of the first communication protocol or the connection rejection response signal of the first communication protocol and
   causes the own connection device to transmit the connection request signal of the second communication protocol to the communication destination side connection device via the short-range wireless communication line.

3. The short-range wireless communication apparatus according to claim 2, wherein:
   when the control device determines that, after the own connection device stops waiting for the receipt of the connection permission response signal of the first communication protocol or the connection rejection response signal of the first communication protocol and transmits the connection request signal of the second communication protocol to the communication destination side connection device via the short-range wireless communication line, the own connection device receives the connection permission response signal of the second communication protocol or the connection rejection response signal of the second communication protocol, the control device
   causes the own connection device to transmit the connection request signal of the first communication protocol to the communication destination side connection device via the short-range wireless communication line.

4. The short-range wireless communication apparatus according to claim 2, wherein
   when the control device determines that, after the own connection device stops waiting for the receipt of the connection permission response signal of the first communication protocol or the connection rejection response signal of the first communication protocol and transmits the connection request signal of the second communication protocol to the communication destination side connection device via the short-range wireless communication line, a connection process of connecting the second communication protocol is successfully or abnormally ended, the control device
   causes the own connection device to transmit the connection request signal of the first communication protocol to the communication destination side connection device via the short-range wireless communication line.

5. The short-range wireless communication apparatus according to claim 2, wherein:
   when the control device determines that, after the own connection device stops waiting for the receipt of the connection permission response signal of the first communication protocol or the connection rejection response signal of the first communication protocol and transmits the connection request signal of the second communication protocol to the communication destination side connection device via the short-range wireless communication line, the own connection device receives the connection permission response signal of the second communication protocol or the connection rejection response signal of the second communication protocol, the control device
   causes the own connection device to resume waiting for receipt of the connection permission response signal of the first communication protocol or the connection rejection response signal of the first communication protocol.

6. The short-range wireless communication apparatus according to claim 1, wherein:

when the control device determines that priority level of the second communication protocol is lower than that of the first communication protocol, the control device causes the own connection device to continue waiting for the receipt of the connection permission response signal of the first communication protocol or the connection rejection response signal of the first communication protocol from the communication destination side connection device without stopping the own connection device from waiting for the receipt of the connection permission response signal of the first communication protocol or the connection rejection response signal of the first communication protocol from the communication destination side connection device.

7. The short-range wireless communication apparatus according to claim 6, wherein:

when the control device determines that, after the own connection device continues, without stopping, waiting for the receipt of the connection permission response signal of the first communication protocol or the connection rejection response signal of the first communication protocol from the communication destination side connection device, the own connection device receives the connection permission response signal of the first communication protocol or the connection rejection response signal of the first communication protocol from the communication destination side connection device, the control device causes the own connection device to transmit the connection request signal of the second communication protocol to the communication destination side connection device via the short-range wireless communication line.

8. The short-range wireless communication apparatus according to claim 1, wherein:

when the control device determines that, for a predetermined time period, the own connection device continues waiting for the receipt of the connection permission response signal of the first communication protocol or the connection rejection response signal of the first communication protocol from the communication destination side connection device due to transmission of the connection request signal of the first communication protocol from the own connection device to the communication destination side connection device via the short-range communication line and that the predetermined time period has elapsed without the own connection device's receipt of the connection permission response signal of the first communication protocol nor the connection rejection response signal of the first communication protocol from the communication destination side connection device, the control device causes a notification device to output a notification about the user operation.

* * * * *